United States Patent
Zhang et al.

(10) Patent No.: US 12,423,576 B2
(45) Date of Patent: Sep. 23, 2025

(54) METHOD AND APPARATUS FOR UPDATING PARAMETER OF MULTI-TASK MODEL, AND STORAGE MEDIUM

(71) Applicant: BEIJING BAIDU NETCOM SCIENCE AND TECHNOLOGY CO., LTD., Beijing (CN)

(72) Inventors: Wenhui Zhang, Beijing (CN); Dianhai Yu, Beijing (CN); Zhihua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 975 days.

(21) Appl. No.: 17/444,687

(22) Filed: Aug. 9, 2021

(65) Prior Publication Data
US 2021/0374542 A1 Dec. 2, 2021

(30) Foreign Application Priority Data
Dec. 14, 2020 (CN) .......................... 202011474877.6

(51) Int. Cl.
*G06N 3/08* (2023.01)
*G06F 8/65* (2018.01)
(Continued)

(52) U.S. Cl.
CPC ................. *G06N 3/08* (2013.01); *G06F 8/65* (2013.01); *G06N 3/045* (2023.01); *G06N 3/063* (2013.01);
(Continued)

(58) Field of Classification Search
CPC .......... G06N 3/08; G06N 3/045; G06N 3/063; G06N 20/00; G06N 5/02; G06N 20/20; G06F 8/65
See application file for complete search history.

(56) References Cited

U.S. PATENT DOCUMENTS

2012/0191631 A1* 7/2012 Breckenridge ........ G06N 20/00
706/12
2013/0097011 A1* 4/2013 Wang ..................... G06Q 30/02
705/14.45
(Continued)

FOREIGN PATENT DOCUMENTS

CN 111881968 A 11/2020
KR 20200078531 A 7/2020
(Continued)

OTHER PUBLICATIONS

Zhao, Ying, et al. "Multi-task network anomaly detection using federated learning." Proceedings of the 10th international symposium on information and communication technology. 2019. (Year: 2019).*
(Continued)

*Primary Examiner* — Michelle T Bechtold
*Assistant Examiner* — Nicholas S Wu
(74) *Attorney, Agent, or Firm* — Lippes Mathias LLP (57) ABSTRACT

The invention discloses a method and an apparatus for updating parameters of a multi-task model. The method includes: obtaining a training sample set, in which the training sample set comprises a plurality of samples and a task to which each sample belongs; putting each sample into a corresponding sample queue sequentially according to the task to which each sample belongs; training a shared network layer in the multi-task model and a target sub-network layer of tasks associated with the sample queue with samples in the sample queue in case that the number of the samples in the sample queue reaches a training data requirement, so as to generate a model parameter update gradient corresponding to the tasks associated with the sample queue; and updating parameters of the shared network layer and the
(Continued)

target sub-network layer in a parameter server according to the model parameter update gradient.

5 Claims, 4 Drawing Sheets

(51) Int. Cl.
    *G06N 3/045*     (2023.01)
    *G06N 3/063*     (2023.01)
    *G06N 5/02*     (2023.01)
    *G06N 20/00*     (2019.01)
    *G06N 20/20*     (2019.01)

(52) U.S. Cl.
    CPC ............... *G06N 5/02* (2013.01); *G06N 20/00* (2019.01); *G06N 20/20* (2019.01)

(56) References Cited

U.S. PATENT DOCUMENTS

| | | | |
|---|---|---|---|
| 2013/0346182 A1* | 12/2013 | Cheng | G06Q 30/0242 705/14.41 |
| 2019/0130275 A1 | 5/2019 | Chen et al. | |
| 2019/0286986 A1 | 9/2019 | Bin et al. | |
| 2020/0104706 A1 | 4/2020 | Sandler et al. | |
| 2020/0349464 A1* | 11/2020 | Lin | G06N 3/084 |
| 2022/0405808 A1* | 12/2022 | Khoury | G06F 16/951 |

FOREIGN PATENT DOCUMENTS

| | | |
|---|---|---|
| WO | 2018047225 A1 | 3/2018 |
| WO | 2019198814 A1 | 10/2019 |

OTHER PUBLICATIONS

Wen, Hong, et al. "Entire space multi-task modeling via post-click behavior decomposition for conversion rate prediction." Proceedings of the 43rd International ACM SIGIR conference on research and development in Information Retrieval. 2020. (Year: 2020).*

Baytas, Inci M., et al. "Asynchronous multi-task learning." 2016 IEEE 16th International Conference on Data Mining (ICDM). IEEE, 2016. (Year: 2016).*

Ma, Xiao, et al. "Entire space multi-task model: An effective approach for estimating post-click conversion rate." The 41st International ACM SIGIR Conference on Research & Development in Information Retrieval. 2018. (Year: 2018).*

European Patent Office Office Action EP21 191 012.0, mailed Jan. 5, 2023.

OA for KR application 10-2021-0109539, Aug. 26, 2024, 6 pgs.

English translation of OA for KR application 10-2021-0109539, Aug. 26, 2024, 7 pgs.

* cited by examiner

METHOD AND APPARATUS FOR UPDATING PARAMETER OF MULTI-TASK MODEL, AND STORAGE MEDIUM

CROSS-REFERENCE TO RELATED APPLICATION

The present application is based upon and claims priority to Chinese Patent Application No. 202011474877.6, filed on Dec. 14, 2020, the entirety contents of which are incorporated herein by reference.

TECHNICAL FIELD

This disclosure relates to the field of computer technology, in particular to the field of deep learning and artificial intelligence technology, and proposes a method and an apparatus for updating parameters of a multi-task model, and a storage medium.

BACKGROUND

Multi-task learning refers to a training task that optimizes multiple objective functions, which is a form of supervised learning. The core problem and difficulty of multi-task learning is how to process the training data of multiple sub-tasks and balance the optimized learning of multiple sub-tasks.

In the related arts, the training of the multi-task model can be achieved through distributed training, that is, joint training through multiple machines to meet the data capacity limitation of the machine and the performance requirements of deep learning. In distributed training, the most common mode is the parameter server mode. The nodes in the cluster can be divided into two types: computing nodes and parameter service nodes. The computing nodes are responsible for the calculation and learning of the local training data (block), and updating the corresponding parameters; the parameter service nodes are in a distributed storage manner, each node stores a part of the global parameter respectively, and accepts parameter query and updating request of the computing nodes as a server side.

SUMMARY

A method and an apparatus for updating parameters of a multi-task model, a storage medium are provided.

A method for updating parameters of a multi-task model is provided in embodiments of the present disclosure. The method includes: obtaining a training sample set, in which the training sample set comprises a plurality of samples and a task to which each sample belongs; putting each sample into a corresponding sample queue sequentially according to the task to which each sample belongs; training a shared network layer in the multi-task model and a target sub-network layer of tasks associated with the sample queue with samples in the sample queue in case that the number of the samples in the sample queue reaches a training data requirement, so as to generate a model parameter update gradient corresponding to the tasks associated with the sample queue; and updating parameters of the shared network layer and the target sub-network layer in a parameter server according to the model parameter update gradient.

An apparatus for updating parameters of a multi-task model is provided in embodiments of the present disclosure. The apparatus includes: one or more processors; a memory storing instructions executable by the one or more processors; in which the one or more processors are configured to: obtain a training sample set, in which the training sample set comprises a plurality of samples and a task to which each sample belongs; put each sample into a corresponding sample queue sequentially according to the task to which each sample belongs; train a shared network layer in the multi-task model and a target sub-network layer of tasks associated with the sample queue with samples in the sample queue in case that the number of the samples in the sample queue reaches a training data requirement, so as to generate a model parameter update gradient corresponding to the tasks associated with the sample queue; and update parameters of the shared network layer and the target sub-network layer in a parameter server according to the model parameter update gradient.

A non-transitory computer-readable storage medium storing computer instructions is provided, in which when the computer instructions are executed by a computer, the computer is caused to perform the method for updating parameters of a multi-task model of the present disclosure. The method includes: obtaining a training sample set, in which the training sample set comprises a plurality of samples and a task to which each sample belongs; putting each sample into a corresponding sample queue sequentially according to the task to which each sample belongs; training a shared network layer in the multi-task model and a target sub-network layer of tasks associated with the sample queue with samples in the sample queue in case that the number of the samples in the sample queue reaches a training data requirement, so as to generate a model parameter update gradient corresponding to the tasks associated with the sample queue; and updating parameters of the shared network layer and the target sub-network layer in a parameter server according to the model parameter update gradient.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the present disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

The following briefly describes the technical fields involved in the solution of this disclosure.

Artificial intelligence aims at the study of making computers to simulate certain human thinking processes and intelligent behaviors (such as learning, reasoning, thinking, planning, etc.). It has both hardware-level technology and software-level technology. Artificial intelligence hardware technology generally includes computer vision technology, speech recognition technology, natural language processing technology, machine learning/deep learning, big data processing technology, knowledge graph technology and other major directions.

Deep learning is a new research direction in the field of machine learning. It has been introduced into machine learning to bring it closer to the original goal: artificial intelligence. Deep learning is to learn the internal rules and representation levels of sample data. The information obtained in the learning process is of great help to the interpretation of data such as text, images and sounds. Its ultimate goal is to enable machines to have the ability to analyze and learn like humans, and to recognize data such as text, images, and sounds. Deep learning has achieved many results in search technology, data mining, machine learning, machine translation, natural language processing, multimedia learning, speech, recommendation and personalization technology, and other related fields.

In related arts, in the distributed training of a multi-task model, after one task is trained once, the model parameters of all tasks in the multi-task model must be updated, resulting in a problem of decreasing in the accuracy and performance of the multi-task model. The present disclosure proposes a method for updating parameters of multi-task model to solve the problems existing in the related arts.

The method and the apparatus for updating parameters of a multi-task model, the electronic device, the storage medium, and the computer program product provided by the present disclosure will be described in detail below with reference to the accompanying drawings.

Figure 1:
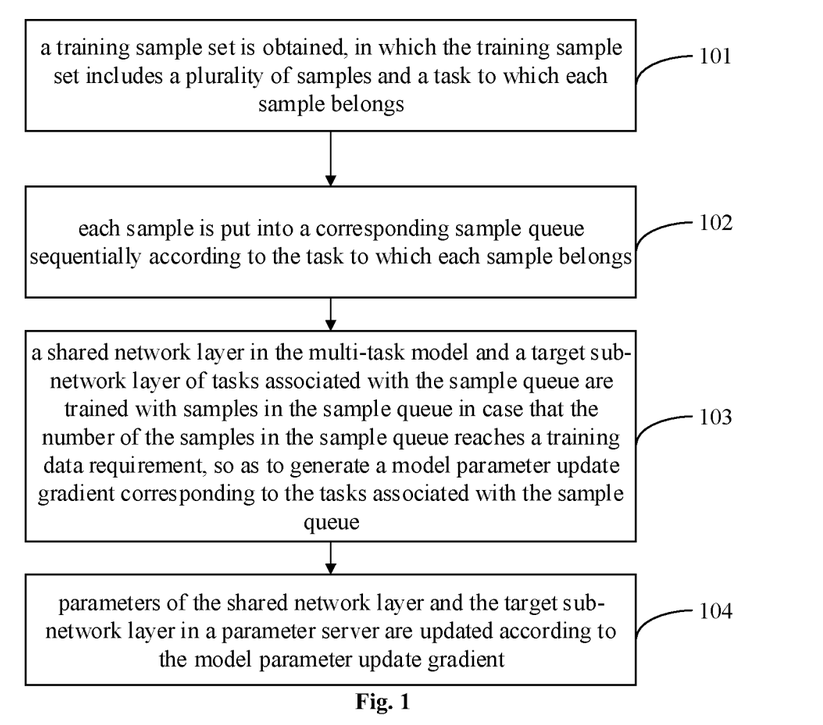
FIG. 1 is a schematic flowchart of a method for updating parameters of a multi-task model provided by an embodiment of the present disclosure.

FIG. 1 is a schematic flowchart of a method for updating parameters of a multi-task model provided by an embodiment of the present disclosure.

As shown in FIG. 1, the method for updating parameters of a multi-task model includes the following steps.

At step 101, a training sample set is obtained, in which the training sample set includes a plurality of samples and a task to which each sample belongs.

It should be noted that the method for updating parameters of a multi-task model in the embodiment of the disclosure can be executed by the apparatus for updating parameters of a multi-task model in the embodiment of the disclosure, and the apparatus for updating parameters of a multi-task model in the embodiment of the disclosure can be configured in any electronic device to implement the method for updating parameters of a multi-task model of the embodiment of the present disclosure.

In the embodiments of the disclosure, the method for updating parameters of a multi-task model of the embodiments of the disclosure can be applied to any model training scenario that needs to realize multiple functions at the same time, for example, it can be applied to application scenarios such as information flow recommendation, advertisement recommendation, search recommendation, etc.

As an example, the method for updating parameters of a multi-task model of the embodiment of the present disclosure can be applied in an advertisement recommendation scenario to train an advertisement recommendation model with multiple subtasks. For example, the advertisement recommendation model can be used to predict the click-through rate and conversion rate of an advertisement, that is, the advertisement recommendation model includes two subtasks: the click-through rate and the conversion rate of the advertisement.

The training sample set may be generated based on historical usage data in the actual disclosure scenario of the multi-task model.

It should be noted that in a supervised training scenario, each sample may include training data and label data for the training data; in an unsupervised training scenario, each sample may only include training data.

For example, when the method for updating parameters of a multi-task model of the embodiment of the present disclosure is applied in an advertisement recommendation scenario, that is, the multi-task model may be an advertisement recommendation model, and the advertisement recommendation model may be applied in an application scenario with an advertisement recommendation function, the training sample set can be obtained from the historical usage data of the application to which the advertisement recommendation model is applied. For example, in an unsupervised training scenario, the feature data of an advertisement in the application, such as the type, duration, and label, can be used as a sample; in a supervised training scenario, the feature data of an advertisement in the disclosure, such as type, duration, and label can be used as training data, and user operation data such as click-through rate, viewing time, the number of favorites (being liked), the number of reposts, the number of shares, the conversion rate and other user operation data of the advertisement are used as the annotation data corresponding to the training data. The training data and the labeled data corresponding to the training data are used as a sample. Furthermore, according to the foregoing method, a training sample set containing a large number of training samples is generated according to the historical usage data of a large number of advertisements in the disclosure.

In the embodiment of the present disclosure, when the training sample set is acquired, it is also possible to mark which task in the multi-task model each sample is used for training, that is, the training sample set may also include the task to which each sample belongs.

At step 102, each sample is put into a corresponding sample queue sequentially according to the task to which each sample belongs.

In the embodiments of this disclosure, since the training objectives for multiple tasks in the multi-task model are different, the samples used for training the respective tasks may also be different, so that the training samples in the training sample set can be classified according to the tasks to which the respective samples belong, the samples belonging to the same task may be put into the same sample queue. Thus, the samples in a sample queue can be used to train a task in the multi-task model.

As a possible implementation, it is also possible to obtain the training sample set in real time during the multi-task model training process, and each time a sample is obtained, it is put into the corresponding sample queue according to the task to which the sample belongs.

At step 103, a shared network layer in the multi-task model and a target sub-network layer of tasks associated with the sample queue are trained with samples in the sample queue in case that the number of the samples in the sample queue reaches a training data requirement, so as to generate a model parameter update gradient corresponding to the tasks associated with the sample queue.

The shared network layer refers to the network layer that all tasks of the multi-task model need to use. The sub-network layer refers to the network layer used by any task in the multi-task model. The target sub-network layer refers to the sub-network layer used by the task that currently needs to be trained.

In the embodiment of the present disclosure, since the number of samples in the sample queue reaches a certain number, the training effect on the task can be guaranteed, so the number of batch data (that is, the training data requirement) can be preset. Therefore, in the process of placing the samples in the training data set into the corresponding sample queue, the number of samples in each sample queue can be determined in real time, and when the number of samples in any sample queue reaches the number of batch data set in advance, the samples in the sample queue are sequentially input into the multi-task model to train the shared network layer in the multi-task model and the target sub-network layer corresponding to the tasks associated with the sample queue using the samples in the sample queue, and to determine the model parameter update gradient corresponding to the tasks associated with the sample queue.

At step 104, parameters of the shared network layer and the target sub-network layer in a parameter server are updated according to the model parameter update gradient.

The parameter server refers to a server for storing model parameters of a multi-task model, and can accept parameter query and update requests from computing nodes to update the stored model parameters.

In the embodiment of the present disclosure, after a round of training is performed on the task in the multi-task model using the samples in the sample queue associated with the task, the generated model parameter update gradient can be sent to the parameter server, so that the parameter server updates the model parameters of the target sub-network layer according to the update gradient of the target sub-network layer included in the generated model parameter update gradient, and updates the model parameters of the shared network layer according to the to the update gradient of the shared network layer included in the generated model parameter update gradient.

According to the technical solution of the embodiment of the present disclosure, each sample is put into a corresponding sample queue sequentially according to the task to which each sample in the training sample set belongs, a shared network layer in the multi-task model and a target sub-network layer of tasks associated with the sample queue are trained with samples in the sample queue in case that the number of the samples in the sample queue reaches a training data requirement, so as to generate a model parameter update gradient corresponding to the tasks associated with the sample queue, and parameters of the shared network layer and the target sub-network layer in a parameter server are updated according to the model parameter update gradient. Therefore, when the number of samples corresponding to a task in the multi-task model meets the batch data requirement, only the samples corresponding to the task are used to train the shared network layer of the multi-task model and the sub-network layer corresponding to the task, and there is no need to update the parameters of the sub-network layer corresponding to other tasks, thereby realizing the local parameter update during the distributed training of the multi-task model, and improving the accuracy of the multi-task model.

In a possible implementation form of the present disclosure, the task to which each sample belongs can be labeled by labeling technology, so as to realize the classification of the training sample set, so as to further improve the training effect of the multi-task model.

The method for updating the parameters of the multi-task model provided by the embodiment of the present disclosure will be further described below in conjunction with FIG. 2.

Figure 2:
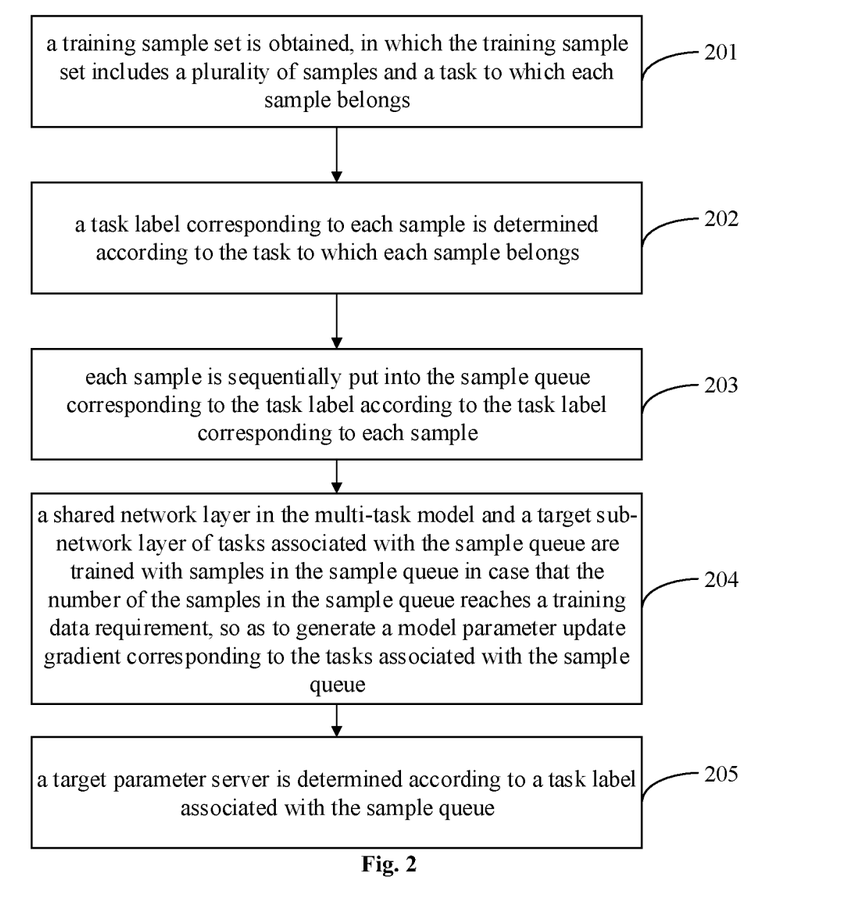
FIG. 2 is a schematic flowchart of a method for updating parameters of a multi-task model provided by another embodiment of the present disclosure.

FIG. 2 is a schematic flowchart of a method for updating parameters of a multi-task model provided by another embodiment of the present disclosure. As shown in FIG. 2, the method for updating parameters of a multi-task model includes the following steps.

At step 201, a training sample set is obtained, in which the training sample set includes a plurality of samples and a task to which each sample belongs.

For the specific implementation process and principle of the foregoing step 201, reference may be made to the detailed description of the foregoing embodiment, which will not be repeated here.

At step 202, a task label corresponding to each sample is determined according to the task to which each sample belongs.

As a possible implementation, an attribute domain may be added to each sample, and then the task label corresponding to each sample may be determined according to the task to which each sample belongs, and then value of the attribute domain may be determined according to the task label corresponding to each sample. Therefore, the value of the attribute domain is used to indicate the task label of the sample.

For example, the multi-task model is an advertisement recommendation model, and the advertisement recommendation model includes two tasks: Task 1 is to predict the click-through rate of advertisements, and Task 2 is to predict the conversion rate of advertisements. If the sample 1 belongs to the Task 1, the task label corresponding to the sample 1 can be determined as 1, and the value of the attribute domain of sample 1 can be determined as [1]; if the sample 2 belongs to the Task 2, then the task label corresponding to the sample 2 can be determined as 2, and the value of the attribute domain of sample 2 can be determined as [2]; if the sample 3 belongs to both the Task 1 and the Task 2, then the task label corresponding to sample 3 may be determined as 1 and 2, and the value of the attribute domain of sample 3 is determined as [1, 2], and so on, until the task labels of all samples in the training sample set are determined.

At step 203, each sample is sequentially put into the sample queue corresponding to the task label according to the task label corresponding to each sample.

In the embodiment of the present disclosure, after the task label corresponding to each sample is determined, samples with the same task label can be divided into the same sample queue.

As an example, there may be one or more task labels corresponding to the sample, so that the training sample set can be divided according to the number of task labels corresponding to the sample to determine the sample queue corresponding to each sample.

Scenario One

In the case that any one sample corresponds to one task label, it is determined that the sample is included in the sample queue corresponding to the task label. For example, if the task label corresponding to sample 1 is 1, then sample 1 can be put into the sample queue corresponding to task label 1, in which the sample queue corresponding to task label 1 contains all samples that can be used for training task 1.

Scenario Two

In the case that any one sample corresponds to multiple task labels, it is determined that the sample queue corresponding to each task label of the multiple task labels contains the sample.

For example, if the task labels corresponding to sample 2 are 1 and 2, then sample 2 can be put into the sample queue corresponding to task label 1, and sample 2 can be also put into the sample queue corresponding to task label 2, so that the sample 2 can be used for both training task 1 and training task 2.

At step 204, a shared network layer in the multi-task model and a target sub-network layer of tasks associated with the sample queue are trained with samples in the sample queue in case that the number of the samples in the sample queue reaches a training data requirement, so as to generate a model parameter update gradient corresponding to the tasks associated with the sample queue.

For the specific implementation process and principle of the foregoing step 204, reference may be made to the detailed description of the foregoing embodiment, which will not be repeated here.

At step 205, a target parameter server is determined according to a task label associated with the sample queue.

In the embodiment of the present disclosure, model parameters corresponding to different tasks can be stored in different parameter servers to facilitate updating of local parameters of the multi-task model. Therefore, the task label corresponding to each parameter server can be determined according to the tasks associated with the model parameters stored in each parameter server, so as to establish the correspondence between the task label and the parameter server, and the task to which the model parameters stored in the respective parameter servers belongs may be labeled. Therefore, after using the samples in the sample queue to complete a round of training for any task in the multi-task model and generating the model parameter update gradient, the target parameter server corresponding to the task label may be determined according to the task label corresponding to the sample queue and the corresponding relationship between the task label and the parameter server.

At step 206, the model parameter update gradient is sent to the target parameter server to allow the target parameter server updates the parameters of the shared network layer and the target sub-network layer according to the model parameter update gradient.

In the embodiment of the present disclosure, after the target parameter server corresponding to the task that stores the current training is determined, the model parameter update gradient corresponding to the task can be sent to the target parameter server, so that the target parameter server can update the stored model parameters of the shared network layer according to the update gradient of the shared network layer, and update the stored model parameters of the target sub-network layer according to the update gradient of the target sub-network layer.

According to the technical solution of the embodiment of the present disclosure, the task label corresponding to each sample is determined according to the task to which each sample in the training sample set belongs, and each sample is sequentially placed into the sample queue corresponding to the task label according to the task label corresponding to each sample, then when the number of samples in any sample queue meets the training data requirement, the data in the sample queue is used to train the shared network layer in the multi-task model and the target sub-network layer corresponding to the tasks associated with the sample queue, so as to generate the model parameter update gradient corresponding to the task associated with the sample queue, and then the target parameter server may be determined according to the task label associated with the sample queue, such that the generated model parameter update gradient is sent to the target parameter server, and the target parameter server updates the parameters of the shared network layer and the target sub-network layer according to the update gradient. Therefore, the task to which each sample belongs is marked by labeling technology, so as to classify the training sample set, and the model parameters corresponding to different tasks are stored through different parameter servers, and then when the number of corresponding samples reaches the batch data requirement, only the samples corresponding to the task are used to train the shared network layer of the multi-task model in the multi-task model and the sub-network layer corresponding to the task, without updating the parameters of the sub-network layer corresponding to other tasks. It not only realizes the local parameter updating during the distributed training of the multi-task model, but also improves the accuracy of the multi-task model and further improves the convenience of the local parameter update.

In a possible implementation form of the present disclosure, a weight of each task in the multi-task model can also be used to constrain the update range of each task to the model parameters of the shared network layer, so as to reduce the task bias of multi-task and further improve the accuracy of the multi-task model.

The method for updating the parameters of the multi-task model provided by the embodiment of the present disclosure will be further described below in conjunction with FIG. 3.

Figure 3:
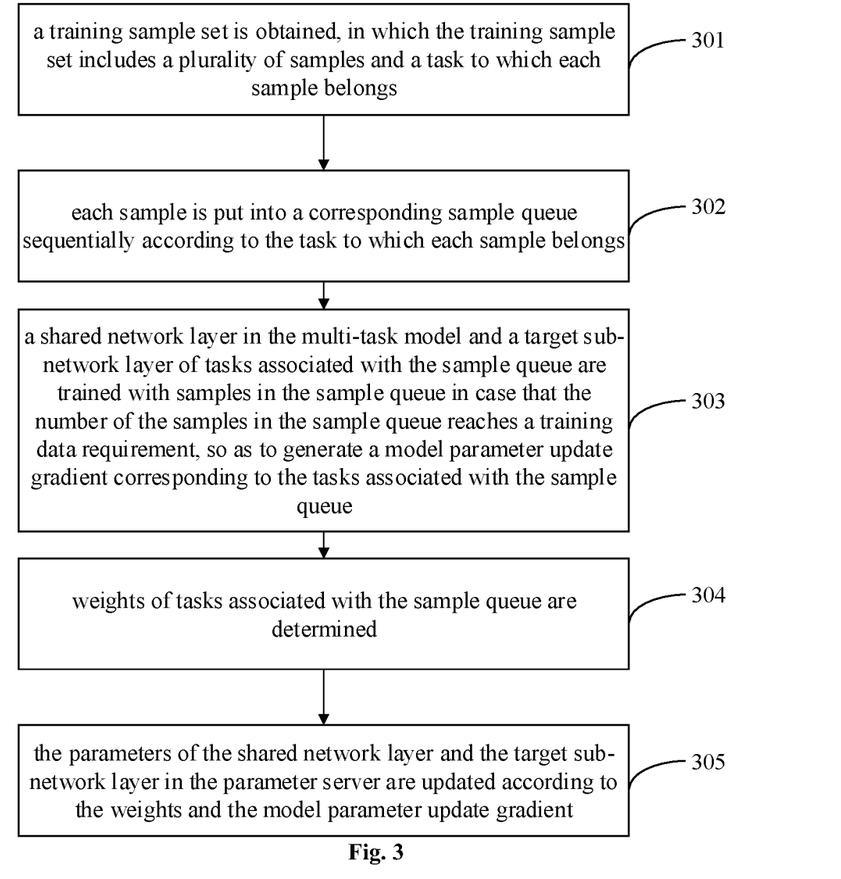
FIG. 3 is a schematic flowchart of a method for updating parameters of a multi-task model provided by another embodiment of the present disclosure.

FIG. 3 is a schematic flowchart of a method for updating parameters of a multi-task model provided by another embodiment of the present disclosure.

As shown in FIG. 3, the method for updating parameters of a multi-task model includes following steps.

At step 301, a training sample set is obtained, in which the training sample set includes a plurality of samples and a task to which each sample belongs.

At step 302, each sample is put into a corresponding sample queue sequentially according to the task to which each sample belongs.

At step 303, a shared network layer in the multi-task model and a target sub-network layer of tasks associated with the sample queue are trained with samples in the sample queue in case that the number of the samples in the sample queue reaches a training data requirement, so as to generate a model parameter update gradient corresponding to the tasks associated with the sample queue.

For the specific implementation process and principles of the foregoing steps 301-303, reference may be made to the detailed description of the foregoing embodiment, which will not be repeated here.

At step 304, weights of tasks associated with the sample queue are determined.

In the embodiment of this disclosure, as the more times the task is trained, the better the optimization effect of the sample corresponding to the task on the multi-task model. Therefore, the weights of the respective tasks can be determined based on the number of times the task is trained, that is, the number of the samples in the sample queue associated with the task meets the requirements of the training data.

As a possible implementation, the shared network layer in the multi-task model and the target sub-network layer corresponding to the task associated with the sample queue can be trained by using the samples in the sample queue, and after the model parameter update gradient corresponding to the task is generated, the number of samples in the sample queue associated with the task reaches the number of times required by the training data, and the number of times is determined as the weight of the task.

For example, when the number of samples in the sample queue associated with Task 1 meets the training data requirement for the first time, the weight of Task 1 can be determined as 1; when the number of samples in the sample queue associated with Task 1 meets the training data requirement for the second time, the weight of Task 1 can be determined as 2.

At step 305, the parameters of the shared network layer and the target sub-network layer in the parameter server are updated according to the weights and the model parameter update gradient.

In the embodiment of the present disclosure, after the weight of the task currently being trained is determined, the weight of the task and the generated model parameter update gradient corresponding to the task may be used to update the model parameters of the shared network layer and the model parameters of the target sub-network layer corresponding to the task in the parameter server.

As a possible implementation, due to the shared network layer in the multi-task model, the samples in the sample queue corresponding to all tasks can be processed, which can affect the performance of all tasks in the multi-task model, and the sub-network layer corresponding to each task only processes the samples in the sample queue corresponding to the task, and has nothing to do with the samples and performance of other tasks in the multi-task model. Therefore, when the parameters of the shared network layer are updated, the weight of the task can be introduced. That is, in a possible implementation manner of the embodiment of the present disclosure, the foregoing step 305 may include: updating the parameters of the target sub-network layer according to the model parameter update gradient; determining an update gradient of the shared network layer according to the weights and the model parameter update gradient; and updating the parameters of the shared network layer according to the update gradient of the shared network layer.

In the embodiment of this disclosure, since the sub-network layer corresponding to each task only processes the samples in the sample queue corresponding to the task, and has nothing to do with the samples and performance of other tasks in the multi-task model, the model parameter update gradient generated by the sample queue may be directly used to update the parameters in the sub-network layer corresponding to the corresponding task, so that the parameter update process of the target sub-network layer is only related to the sample queue corresponding to the corresponding task, and does not depend on samples corresponding to other tasks, thereby reducing the task bias of multi-task model training, and improving the training accuracy of each task.

In the embodiment of the present disclosure, since the shared network layer in the multi-task model may process samples in the sample queue corresponding to all tasks, which can affect the performance of all tasks in the multi-task model, the model parameters of the shared network layer in the multi-task model may be updated according to the model parameter update gradient generated by the sample queues corresponding to respective tasks jointly, so that the shared network layer can have better processing performance in each task.

In a possible implementation manner of the embodiment of the present disclosure, since the weight of the task can reflect the gradient generated by the sample queue corresponding to the task, and the importance of updating the model parameters in the multi-task model training process, the update gradient of the shared network layer may be determined according to the model parameter update gradient and the weight of each task. When the model parameters in the shared network layer are updated according to the update gradient of the shared network layer, the optimization effect of the sample queues of the respective tasks on the shared network layer is balanced by the weights of the tasks, thereby ensuring the accuracy of the shared network layer processing the respective tasks.

Optionally, the product of the update gradient of the model parameters for the task and the weight of the task can be determined as the update gradient of the shared network layer, and the update gradient of the shared network layer can be sent to the parameter server, so that the parameter server can update the parameters of the shared network layer based on the update gradient of the shared network layer.

According to the technical solution of the embodiment of the present disclosure, each sample is put into a corresponding sample queue sequentially according to the task to which each sample belongs in the training sample set, and when the number of samples in any sample queue reaches the training data requirement, the data in the sample queue may be used to train the shared network layer in the multi-task model and the target sub-network layer corresponding to the task associated with the sample queue, so as to generate the model parameter update gradient corresponding to the task associated with the sample queue, Then, the parameters of the shared network layer and the target sub-network layer in the parameter server are updated according to the weight and update gradient of the task. Therefore, when the number of samples corresponding to a task in the multi-task model meets the batch data requirement, only the samples corresponding to the task are used to train the shared network layer of the multi-task model and the sub-network layer corresponding to the task, and there is no need to update the parameters of the sub-network layer corresponding to other tasks, and the update range of each task updating the model parameters of the shared network layer may be restricted, thereby not only realizing locally updating parameters of the multi-task model when performing the distributed training, but also the task bias of the multi-task is reduced, and the accuracy of the multi-task model is further improved.

In order to implement the above-mentioned embodiments, this disclosure also proposes an apparatus for updating parameters of a multi-task model.

Figure 4:
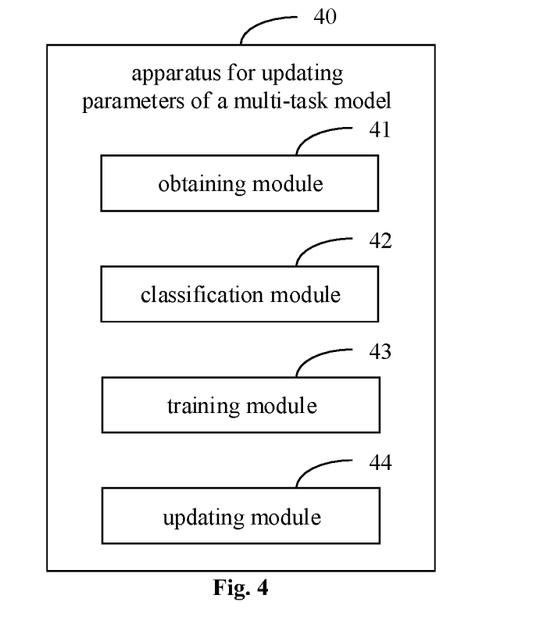
FIG. 4 is a schematic structural diagram of an apparatus for updating parameters of a multi-task model provided by an embodiment of the present disclosure.

FIG. 4 is a schematic structural diagram of an apparatus for updating parameters of a multi-task model provided by an embodiment of the present disclosure.

As shown in FIG. 4, the apparatus 40 includes: an obtaining module 41, configured to obtain a training sample set, in which the training sample set comprises a plurality of samples and a task to which each sample belongs; a classification module 42, configured to put each sample into a corresponding sample queue sequentially according to the task to which each sample belongs; a training module 43, configured to train a shared network layer in the multi-task model and a target sub-network layer of tasks associated with the sample queue with samples in the sample queue in case that the number of the samples in the sample queue reaches a training data requirement, so as to generate a model parameter update gradient corresponding to the tasks associated with the sample queue; and an updating module 44, configured to update parameters of the shared network layer and the target sub-network layer in a parameter server according to the model parameter update gradient.

In actual use, the apparatus for updating parameters of a multi-task model provided in the embodiments of the present disclosure can be configured in any electronic device to execute the aforementioned method for updating parameters of a multi-task model.

According to the technical solution of the embodiment of the present disclosure, each sample is put into a corresponding sample queue sequentially according to the task to which each sample in the training sample set belongs, a shared network layer in the multi-task model and a target sub-network layer of tasks associated with the sample queue are trained with samples in the sample queue in case that the number of the samples in the sample queue reaches a training data requirement, so as to generate a model parameter update gradient corresponding to the tasks associated with the sample queue, and parameters of the shared network layer and the target sub-network layer in a parameter server are updated according to the model parameter update gradient. Therefore, when the number of samples corresponding to a task in the multi-task model meets the batch data requirement, only the samples corresponding to the task are used to train the shared network layer of the multi-task model and the sub-network layer corresponding to the task, and there is no need to update the parameters of the sub-network layer corresponding to other tasks, thereby realizing the local parameter update during the distributed training of the multi-task model, and improving the accuracy of the multi-task model.

In a possible implementation form of this disclosure, the above-mentioned classification module 42 includes: a first determining unit, configured to determine a task label corresponding to each sample according to the task to which each sample belongs; and a classification unit, configured to put each sample sequentially into the sample queue corresponding to the task label according to the task label corresponding to each sample.

Further, in another possible implementation form of this disclosure, the above classification unit includes: a first determining sub-unit, configured to determine, in the case that a sample corresponds to the plurality of task labels, that the sample queue corresponding to each task label of a plurality of task labels contains the sample.

Further, in another possible implementation form of this disclosure, the above-mentioned updating module 44 includes: a second determining unit, configured to determine a target parameter server according to a task label associated with the sample queue; and a sending unit, configured to send the model parameter update gradient to the target parameter server to allow the target parameter server updates the parameters of the shared network layer and the target sub-network layer according to the model parameter update gradient.

Further, in another possible implementation form of this disclosure, the above-mentioned updating module 44 includes: a third determining unit, configured to determine weights of tasks associated with the sample queue; and an updating unit, configured to update the parameters of the shared network layer and the target sub-network layer in the parameter server according to the weights and the model parameter update gradient.

Further, in another possible implementation form of this disclosure, the above-mentioned updating unit includes: a first updating sub-unit, configured to update the parameters of the target sub-network layer according to the model parameter update gradient; a second determining sub-unit, configured to determine an update gradient of the shared network layer according to the weights and the model parameter update gradient; and a second updating sub-unit, configured to update the parameters of the shared network layer according to the update gradient of the shared network layer.

It should be noted that the foregoing explanation of the embodiments of the method for updating parameters of a multi-task model shown in FIGS. 1, 2 and 3 is also applicable to the apparatus 40 for updating parameters of a multi-task model, which will not be described in detail herein.

According to the technical solution of the embodiment of the present disclosure, the task label corresponding to each sample is determined according to the task to which each sample in the training sample set belongs, and each sample is sequentially placed into the sample queue corresponding to the task label according to the task label corresponding to each sample, then when the number of samples in any sample queue meets the training data requirement, the data in the sample queue is used to train the shared network layer in the multi-task model and the target sub-network layer corresponding to the tasks associated with the sample queue, so as to generate the model parameter update gradient corresponding to the task associated with the sample queue, and then the target parameter server may be determined according to the task label associated with the sample queue, such that the generated model parameter update gradient is sent to the target parameter server, and the target parameter server updates the parameters of the shared network layer and the target sub-network layer according to the update gradient. Therefore, the task to which each sample belongs is marked by labeling technology, so as to classify the training sample set, and the model parameters corresponding to different tasks are stored through different parameter servers, and then when the number of corresponding samples reaches the batch data requirement, only the samples corresponding to the task are used to train the shared network layer of the multi-task model in the multi-task model and the sub-network layer corresponding to the task, without updating the parameters of the sub-network layer corresponding to other tasks. It not only realizes the local parameter updating during the distributed training of the multi-task model, but also improves the accuracy of the multi-task model and further improves the convenience of the local parameter update.

An electronic device and a readable storage medium are further provided according to embodiments of the present disclosure.

Figure 5:
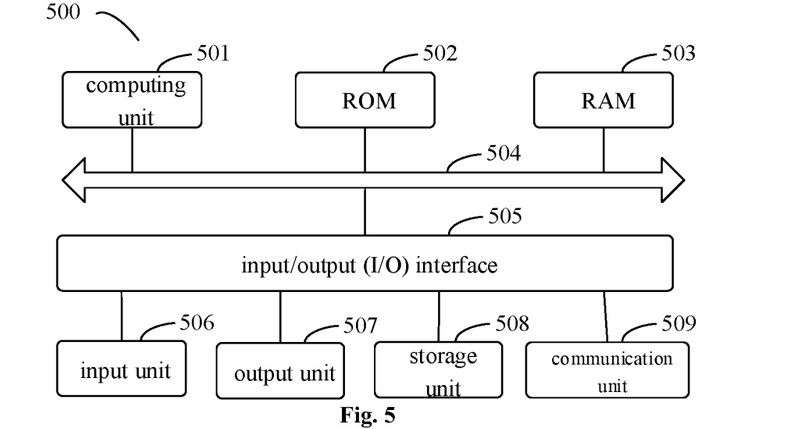
FIG. 5 is a block diagram of an electronic device used to implement the method for updating parameters of a multi-task model in an embodiment of the present disclosure.

As shown in FIG. 5, FIG. 5 is a block diagram of an electronic device 500 used to implement the embodiments of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As shown in FIG. 5, the device 500 includes a computing unit 501, which can execute according to a computer program stored in a read-only memory (ROM) 502 or a computer program loaded from the storage unit 508 into a random access memory (RAM) 503 to perform various appropriate actions and processing. In the RAM 503, various programs and data required for the operation of the device 500 can also be stored. The calculation unit 501, the ROM 502, and the RAM 503 are connected to each other through a bus 504. An input/output (I/O) interface 505 is also connected to the bus 504.

Multiple components in the device 500 are connected to the I/O interface 505, including: an input unit 506, such as a keyboard, a mouse, etc.; an output unit 507, such as various types of displays, speakers, etc.; and a storage unit 508, such as a magnetic disk, an optical disk, etc.; and a communication unit 509, such as a network card, a modem, a wireless communication transceiver, etc. The communication unit 509 allows the device 500 to exchange information/data with other devices through a computer network such as the Internet and/or various telecommunication networks.

The computing unit 501 may be various general-purpose and/or special-purpose processing components with processing and computing capabilities. Some examples of computing unit 501 include, but are not limited to, central processing unit (CPU), graphics processing unit (GPU), various dedicated artificial intelligence (AI) computing chips, various computing units running machine learning model algorithms, digital signal processing DSP, and any appropriate processor, controller, microcontroller, etc. The calculation unit 501 executes the various methods and processes described above, for example, a parameter update method of a multi-task model. For example, in some embodiments, the parameter update method of the multi-task model can be implemented as a computer software program, which is tangibly contained in a machine-readable medium, such as the storage unit 508. In some embodiments, part or all of the computer program may be loaded and/or installed on the device 500 via the ROM 502 and/or the communication unit 509. When the computer program is loaded into the RAM 503 and executed by the computing unit 501, one or more steps of the parameter update method of the multi-task model described above can be executed. Alternatively, in other embodiments, the calculation unit 501 may be configured to execute the parameter update method of the multi-task model in any other suitable manner (for example, by means of firmware).

The various implementations of the systems and technologies described in this article can be implemented in digital electronic circuit systems, integrated circuit systems, field programmable gate arrays (FPGA), disclosure-specific integrated circuits (ASIC), disclosure-specific standard products (ASSP), system-on-chip (SOC), load programmable logic device (CPLD), computer hardware, firmware, software, and/or their combination. These various embodiments may include: being implemented in one or more computer programs, the one or more computer programs may be executed and/or interpreted on a programmable system including at least one programmable processor, the programmable processor may be a dedicated or general-purpose programmable processor that can receive data and instructions from the storage system, at least one input device, and at least one output device, and transmit the data and instructions to the storage system, the at least one input device, and the at least one output device.

The program code used to implement the method of the present disclosure can be written in any combination of one or more programming languages. These program codes can be provided to the processors or controllers of general-purpose computers, special-purpose computers, or other programmable data processing devices, so that when the program codes are executed by the processors or controllers, the functions specified in the flowcharts and/or block diagrams/operation is implemented. The program code can be executed entirely on the machine, partly executed on the machine, partly executed on the machine and partly executed on the remote machine as an independent software package, or entirely executed on the remote machine or server.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or device, or any suitable combination of the foregoing. More specific examples of machine-readable storage media would include electrical connections based on one or more wires, portable computer disks, hard drives, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an disclosure server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

A computer program product is further provided in the present disclosure, which is configured to implemented the event extraction method when executed by an instruction processor.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for updating parameters of a multi-task model, wherein the multi-task model is an advertisement recommendation model, the advertisement recommendation model comprises two subtasks which are predicting a click-through rate and a conversion rate of the advertisement, the method comprising:
   obtaining a training sample set, wherein the training sample set comprises a plurality of samples and a task to which each sample belongs;
   putting each sample into a corresponding sample queue sequentially according to a task to which each sample belongs;
   training a shared network layer in the multi-task model and a target sub-network layer of a task associated with a sample queue with only samples corresponding to the task in the sample queue;
   determining a number of the samples in the sample queue reaches a training data requirement;
   wherein in response to the determination the number of the samples in the sample queue reaches the training data requirement, determining a model parameter update gradient corresponding to the task associated with the sample queue; and
   updating parameters of the shared network layer and the target sub-network layer in a parameter server according to the model parameter update gradient;
   wherein the training is a supervised training scenario, wherein a sample comprises training data and annotation data corresponding to the training data, the training data is feature data of an advertisement comprising the type, the duration, or the label, and the annotation data comprises user operation data comprising a click-through rate, viewing time, a number of favorites, a number of reposts, a number of shares, a conversion rate;
   wherein putting each sample into the corresponding sample queue sequentially according to a task to which each sample belongs comprises:
   determining a task label corresponding to each sample according to a task to which each sample belongs; and
   putting each sample sequentially into a sample queue corresponding to the task label according to the task label corresponding to each sample;
   wherein updating the parameters of the shared network layer and the target sub-network layer in the parameter server according to the model parameter update gradient comprises:
   determining weights of the task associated with the sample queue;
   updating the parameters of the target sub-network layer according to the model parameter update gradient;
   determining an update gradient of the shared network layer according to the weights and the model parameter update gradient; and
   updating the parameters of the shared network layer according to the update gradient of the shared network layer.

2. The method of claim 1, wherein putting each sample sequentially into the sample queue corresponding to the task label according to the task label corresponding to each sample comprises:
   determining, in the case that a sample corresponds to the plurality of task labels, that the sample queue corresponding to each task label of a plurality of task labels contains the sample.

3. An apparatus for updating parameters of a multi-task model, wherein the multi-task model is an advertisement recommendation model, the advertisement recommendation model comprises two subtasks which are predicting a click-through rate and a conversion rate of the advertisement, the method comprising:
   one or more processors;
   a memory storing instructions executable by the one or more processors;
   wherein the one or more processors are configured to:
   obtain a training sample set, wherein the training sample set comprises a plurality of samples and a task to which each sample belongs;
   put each sample into a corresponding sample queue sequentially according to a task to which each sample belongs;
   train a shared network layer in the multi-task model and a target sub-network layer of a task associated with a sample queue with only samples corresponding to the task in the sample queue;
   determine a number of the samples in the sample queue reaches a training data requirement;
   wherein in response to the determination the number of the samples in the sample queue reaches the training data requirement, determine a model parameter update gradient corresponding to the task associated with the sample queue; and
   update parameters of the shared network layer and the target sub-network layer in a parameter server according to the model parameter update gradient;
   wherein the training is a supervised training scenario, wherein a sample comprises training data and annotation data corresponding to the training data, the training data is feature data of an advertisement comprising the type, the duration, or the label, and the annotation data comprises user operation data comprising a click-through rate, viewing time, a number of favorites, a number of reposts, a number of shares, a conversion rate;

wherein the one or more processors are configured to:

determine a task label corresponding to each sample according to a task to which each sample belongs; and put each sample sequentially into a sample queue corresponding to the task label according to the task label corresponding to each sample;

determine weights of the task associated with the sample queue;

update the parameters of the target sub-network layer according to the model parameter update gradient;

determine an update gradient of the shared network layer according to the weights and the model parameter update gradient; and update the parameters of the shared network layer according to the update gradient of the shared network layer.

4. The apparatus of claim 3, wherein the one or more processors are configured to:

determine, in the case that a sample corresponds to the plurality of task labels, that the sample queue corresponding to each task label of a plurality of task labels contains the sample.

5. A non-transitory computer-readable storage medium storing computer instructions, wherein when the computer instructions are executed by a computer, the computer is caused to perform a method for updating parameters of a multi-task model, wherein the multi-task model is an advertisement recommendation model, the advertisement recommendation model comprises two subtasks which are predicting a click-through rate and a conversion rate of the advertisement, and the method comprises:

obtaining a training sample set, wherein the training sample set comprises a plurality of samples and a task to which each sample belongs;

putting each sample into a corresponding sample queue sequentially according to a task to which each sample belongs;

training a shared network layer in the multi-task model and a target sub-network layer of a task associated with a sample queue with only samples corresponding to the task in the sample queue;

determining a number of the samples in the sample queue reaches a training data requirement;

wherein in response to the determination the number of the samples in the sample queue reaches the training data requirement, determining a model parameter update gradient corresponding to the task associated with the sample queue; and update parameters of the shared network layer and the target sub-network layer in a parameter server according to the model parameter update gradient;

wherein the training is a supervised training scenario, wherein a sample comprises training data and annotation data corresponding to the training data, the training data is feature data of an advertisement comprising the type, the duration, or the label, and the annotation data comprises user operation data comprising a click-through rate, viewing time, a number of favorites, a number of reposts, a number of shares, a conversion rate;

wherein putting each sample into the corresponding sample queue sequentially according to a task to which each sample belongs comprises:

determining a task label corresponding to each sample according to a task to which each sample belongs; and putting each sample sequentially into a sample queue corresponding to the task label according to the task label corresponding to each sample;

wherein updating the parameters of the shared network layer and the target sub-network layer in the parameter server according to the model parameter update gradient comprises:

determining weights of the task associated with the sample queue;

updating the parameters of the target sub-network layer according to the model parameter update gradient;

determining an update gradient of the shared network layer according to the weights and the model parameter update gradient; and updating the parameters of the shared network layer according to the update gradient of the shared network layer.

* * * * *